3,454,234
BLADE COMBINATION FOR MACHINES FOR
CHIPPING AND SHAVING SOLID MATERIALS
Karl P. Schoeppner, P.O. Box 671,
Bay City, Mich. 48706
Original application Jan. 22, 1964, Ser. No. 339,413, now
Patent No. 3,268,178, dated Aug. 23, 1966. Divided and
this application Apr. 8, 1966, Ser. No. 559,021
Int. Cl. B02c *18/14, 18/18, 18/22*
U.S. Cl. 241—294           5 Claims

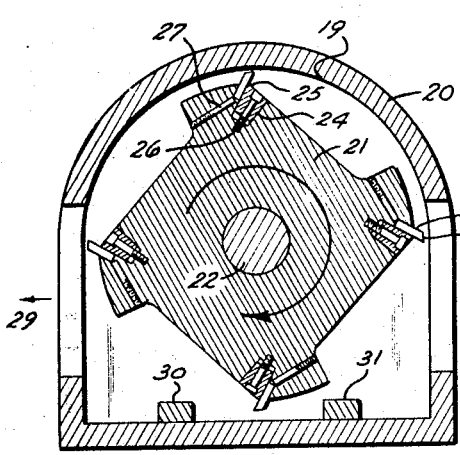
FIG. II
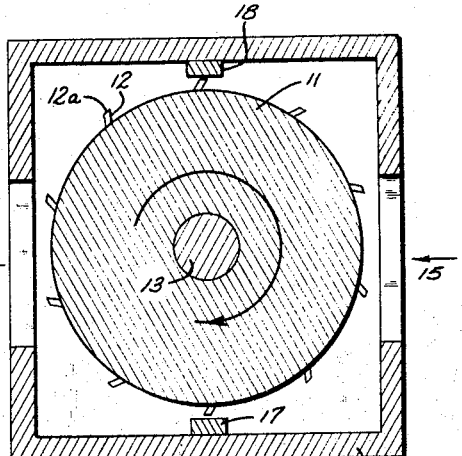
FIG. I
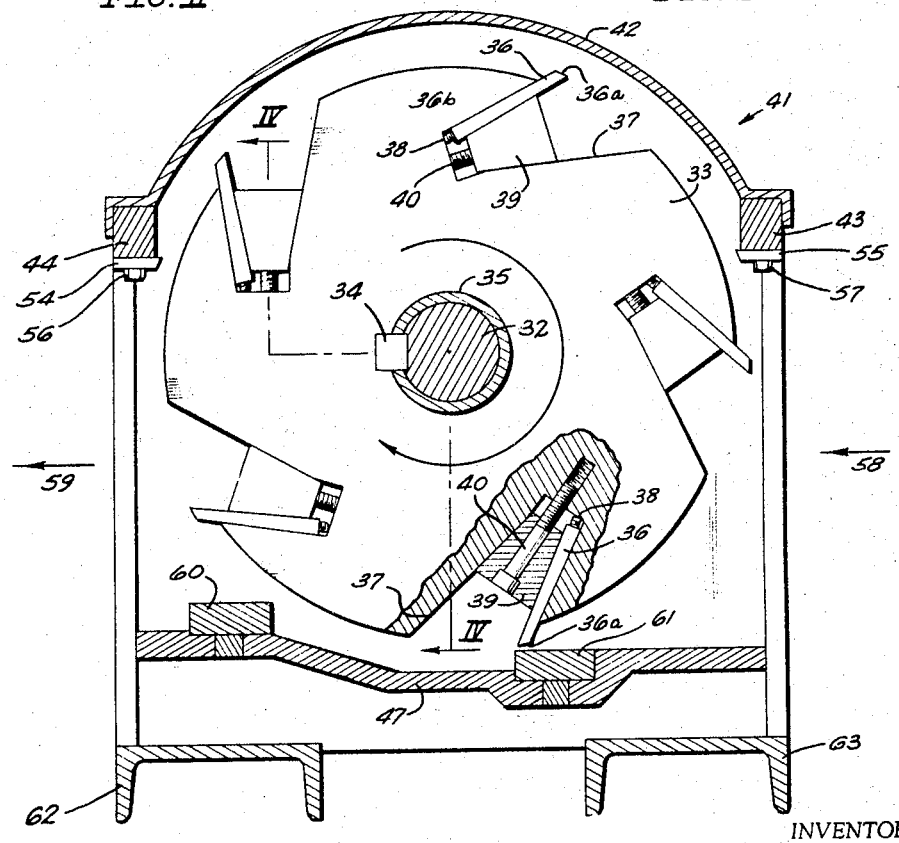
FIG. III
INVENTOR.
KARL P. SCHOEPPNER

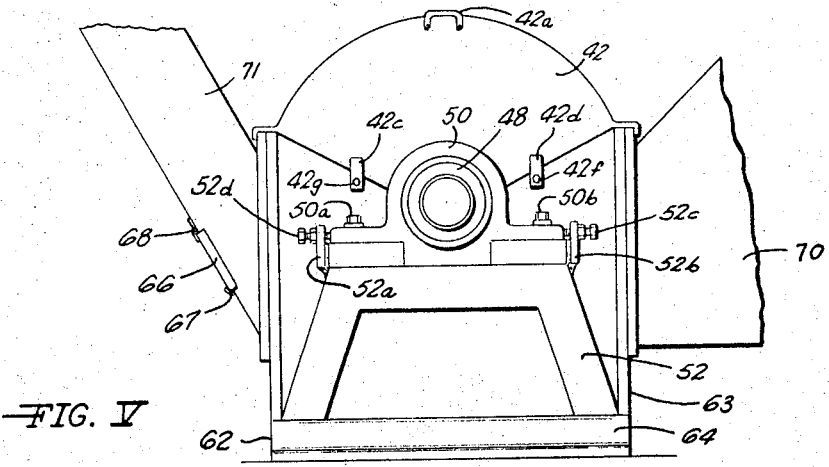
FIG. V
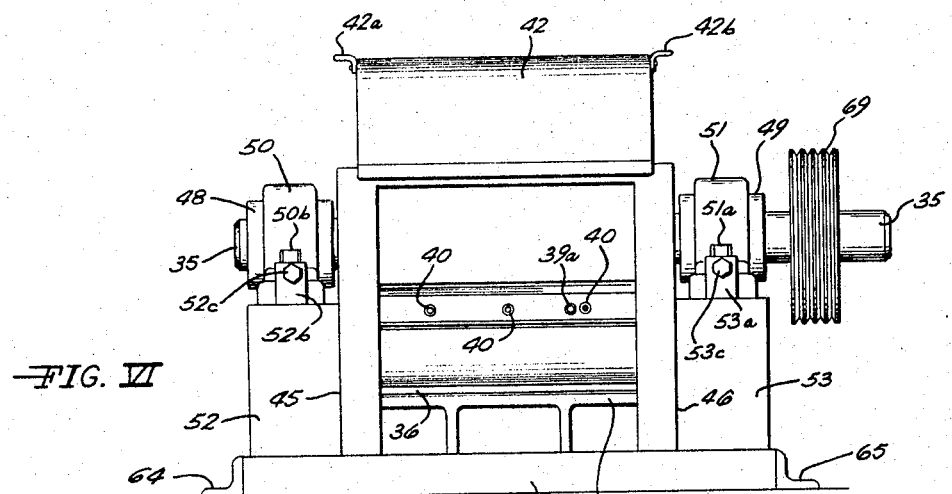
FIG. VI
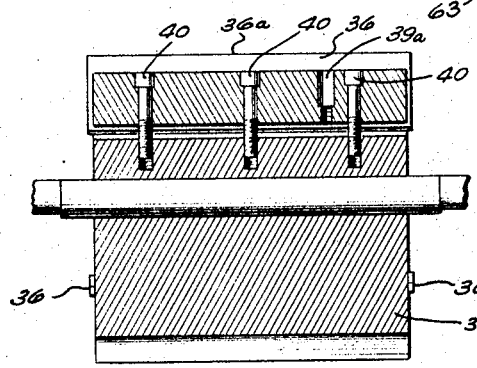
FIG. IV
INVENTOR.
KARL P. SCHOEPPNER United States Patent Office 3,454,234
Patented July 8, 1969

ABSTRACT OF THE DISCLOSURE

An improved cylindrical cutterhead and housing combination for the ease of removal of chips, shavings and the like, particularly those composed of wood, from cutting machines is described. In particular, sealing elements are provided in the housing which in combination with the rotating cutterhead provides a blower type action to force the chips, shavings and the like through an outlet chip shute. Further, improved blades tapering towards the cutting edge and with adjustable screws on the edge opposite the cutting edge which provide improved locking action on the cutterhead are described.

---

The present application is a divisional application of application Ser. No. 339,413, filed Jan. 22, 1964, now United States Patent No. 3,268,178.

This invention relates to machines which are useful for chipping various solid materials, particularly wood materials such as branches and the like. More particularly, this invention relates to an improved machine for chipping, shaving and reducing various solid materials.

This invention is particularly concerned with class of machines, for chipping, shaving and reducing various solid materials, which comprise cutter means having a longitudinal axis and a cylindrical surface parallel to the longitudinal axis; a plurality of blade means each having a cutting edge and mounted on the cutter means so that the cutting edges project from the cylindrical surface of the cutter means an equal distance and positioned in spaced relation around and extending across the cutter means; housing means mounting the cutter means for rotation on its longitudinal axis, the housing means having inlet and outlet openings and cutting bar means positioned within and on the housing means between the inlet and outlet openings in the housing means which are in closely spaced and cutting relation to a circle the radius of which is defined by the longitudinal axis of the cutter means and the cutting edge of any one of the blades means. In general a feeder chute is connected to the inlet opening of the machine to direct the solid materials into the inlet opening. Also a tubular chip chute is generally attached to the outlet opening to direct the flow of chips from the outlet opening. The machine is suitably mounted, usually on a frame with wheels for ease of transport.

In operation, solid materials are fed into the machine through the feeder chute and the inlet opening and then come into contact with the rotating cutter and blade means combination. The blades carry the brush to the point where the cutting bar means are positioned and the brush is chipped by a shearing action between the blade means and cutting bar means. Some of the chips are then carried out through the outlet opening, due to the centrifugal force of the rotating cutter and blade means combination and also due to a blower type action because of the rotating blade and cutter combination, and travel through the chip chute. The remainder of the chips (usually between 10–20 percent) are carried around by the rotating cutter and blade combination and are thrown out the inlet chute.

Various features of such prior art machines are illustrated in Patents Nos. 2,634,062, 2,825,373, 2,925,371 and 2,951,518. In general, these patents illustrate various improved features not relevant to the present invention, but various prior art cutter, blade and housing means are shown.

Current practice is to connect a blower element to the chip chute. This has been done in an attempt to overcome the problem of chip packing in the chip chute because of lack of sufficient velocity imparted to the chips by the rotating cutter means. This has not proved to be a good solution to the problem of chip packing because the blower forces the chips back through the machine and through the inlet opening out the feeder chute. The prior art machines which do not utilize a blower for chip removal produce unsatisfactory results. It has been found that the velocity of the chips imparted by the rotating cutter and blade means combination in prior art machines is generally not sufficient to carry them through the chip chute and they accumulate in and eventually clog the chip chute.

In operations in the field with brush chipping machines, chip removal from the machine is very important. In most instances the chips are collected in trucks and the like for removal from the point of pruning or logging operations. This is done to prevent fires, protect health, eliminate many hazards, and in addition reduce expense of labor hours and hauling branches and limbs to dumps and incinerators and to restore the landscape to its original clean state. For example, ten truck loads of branches can be reduced to one truck load of chips which are useable for many purposes. Thus the chips must be fed into containers at higher levels than that of the rotating cutter and blade means combination. Further the chips must have sufficient velocity to carry them from the exit point of the chip chute to the container. Thus, when a truck is on a road, for instance, the chips must be carried across drainage ditches and the like into the container portion of the truck. Thus, the chips must have sufficient exit velocity to carry them to a chip chute and also to carry them some distance from the exit point of the chute.

The problem of chip return to the fed chute, besides resulting in inefficient operation, also creates a serious hazard and inconvenience to the operator. The problem is compounded by the presence of a blower, since more chips are carried back to the feeder chute at a very high speed.

The problems encountered with the prior art brush and wood chipping machines are also present where other materials are to be chipped. The problems of chip removal and chip return both contribute to inefficient and sometimes dangerous operation regardless of the solid material being chipped.

Another problem with the prior art machines of the class described, which have removable blades, is that they have a system which makes it difficult to adjust the dimension between the cutting edge of the blade means and the longitudinal axis of the cutter means. This dimensional adjustment is necessary because of removal of the blades for grinding and sharpening the cutting edge and for replacement. In the prior art machines, a screw element is provided through the cutter means which comes into contact with the blade means to provide the dimensional adjustment. This means of dimensional adjustment makes it extremely difficult and time consuming to accurately mount the blade means on the cutter means after sharpening. The prior art machines having removable blades are preferred by the prior art and thus an improved system for making this dimensional adjustment is needed.

It is therefore an object of the present invention to provide an improved machine for chipping solid materials which imparts sufficient velocity to the chips to carry them through the chip chute and a considerable distance from the chip chute without a blower.

It is further an object of the present invention to provide an improved machine for chipping solid materials which greatly reduces the chip return to the feeder chute.

Further still it is an object of the present invention to provide an improved machine for chipping solid materials which is economical to construct and to operate.

Further still it is an object of the present invention to provide an improved system for dimensional adjustment between the cutting edge of the blade means and the longitudinal axis of the cutter means.

These and other objects will become increasingly apparent to those skilled in the art as the description proceeds.

Referring to the drawings:

FIGURE I is a schematic, cross-sectional end view of an improved machine in accord with the present invention, illustrating cutting means with multiple blade means mounted on it and particularly illustrating the positioning of a sealing element opposite the cutting bar means and between the input and output openings and in closely spaced relation to a circle the radius of which is defined by the longitudinal axis of the cutter means and the cutting edge of any one of the blade means.

FIGURE II is a schematic, cross-sectional end view of another improved machine in accord with the present invention, illustrating cutter means mounting four blade means, with the conventional prior art system for dimensional adjustment of the blades, and particularly illustrating a continuous sealing element opposite dual cutting bar means and between the inlet and outlet openings, the sealing element being in closely spaced relation to a circle the radius of which is defined by the longitudinal axis of the cutter means and the cutting edge of any one of the blade means.

FIGURE III is a cross-sectional, end view of the preferred improved machine in accord with the present invention, illustrating cutter means mounting five blade means, with the improved system for dimensional adjustment of the blades, and particularly illustrating the preferred sealing element opposite dual cutting bar means and between the inlet and outlet openings, the sealing element comprising single or multiple adjustable sealing bars mounted above each of the inlet and outlet openings and being in closely spaced relation to a circle the radius of which is defined by the longitudinal axis of the cutter means and the cutting edge of any one of the blade means.

FIGURE IV is a cross-sectional view longitudinally through the cutter and blades shown in FIGURE III along line IV—IV, illustrating the positioning and mounting of the blade means on the cutter means and particularly illustrating the improved system for dimensional adjustment of the blades.

FIGURE V is a side end view of the assembled machine shown in FIGURE III, illustrating the mounted feeder and chip chutes.

FIGURE VI is a front side view of the assembled machine shown in FIGURE III, illustrating the positioning of the blades across the surface of the cutter.

GENERAL DESCRIPTION

It has been found that the operation of machines for chipping solid materials can be improved by providing a sealing element opposite the cutting bar means inside the housing means and in closely spaced relation to a circle the radius of which is defined by the longitudinal axis of the cutter means and the cutting edge of the blade means. In operation the improved machine with the sealing element greatly increases the speed of chips being thrown out by the rotating cutter and blade means combination over the speed of the chips from prior art machines. Further chip return to the inlet opening is greatly reduced over that of prior art machines and is virtually eliminated by the use of the sealing element.

FIGURE I illustrates an improved machine for chipping solid materials in accord with the present invention. A cylindrical cutter 11, mounted on a shaft 13 for clockwise rotation on its longitudinal axis, is provided. Ten blades 12 having cutting edges 12a are mounted in equally spaced relation around the cylindrical surface of the cutter 11. The blades 12 extend across the cylindrical surface of the cutter 11 parallel to the longitudinal axis of the cutter 11. The blades 12 and the cutting edges 12a are integral with the cutter 11 and project above the surface of the cutter 11 and are inclined towards the direction of rotation.

A housing 14 is provided which surrounds the cutter 11 and blade 12 combination and supports the cutter 11 for rotation around its longitudinal axis. The housing 14 is provided with opposing inlet and outlet openings 15 and 16 which are parallel to the longitudinal axis of the cutter 11. A cutting bar 17 extending the length of the blades 12 is mounted inside the housing 14 between the inlet and outlet openings 15 and 16 in closely spaced and cutting relation to a circle the radius of which is defined by the longitudinal axis of the cutter 11 and the cutting edge 12a of any one of the blades 12. Opposite the cutting bar 17 and extending the length of the blades 12 is a sealing element bar 18 mounted on the housing 14 between the inlet and outlet openings 15 and 16. The sealing bar 18 is in closely spaced relation to the circle the radius of which is defined by the longitudinal axis of the cutter 11 and the cutting edge 12a of any one of the blades 12.

FIGURE II illustrates another type of sealing element 19 which is integral with the housing 20. A cylindrical cutter 21, mounted on a shaft 22 for rotation on its longitudinal axis, is provided. Four blades 23 having a cutting edge 23a are mounted in equally spaced relation around the circumference of and across the surface of the cutter 21 and parallel to the longitudinal axis of the cutter 21. The blades 23 are mounted on one side of a wedge shaped groove 24 having two opposing sides and a bottom side such that the blades 23 and the cutting edges 23a are inclined towards the direction of rotation. The blades 23 are secured to the cutter 21 by means of a wedge 25 and a bolt 26 screwed into the bottom side of the groove 24 through the wedge 25. A regulating screw 27 is mounted through the cutter 21 to come into contact with the rear of the blades 23 so that the positioning of the cutting edges 23a of the blades 23 can be adjusted to change the dimension between the cutting edge 23a of any one of the blades 23 and the longitudinal axis of the cutter 21. This is the conventional prior art system for removably mounting the blades 23 to the cutter 21.

A housing 20 surrounding and mounting the cutter 21 for rotation on its longitudinal axis is provided. The housing 20 is provided with opposing inlet and outlet openings 28 and 29, which are parallel to the longitudinal axis of the cutter 21. Single or multiple cutting bars 30 and 31 extending the length of the blades 23 are mounted inside the housing 20 between the inlet and outlet openings 28 and 29 in closely spaced and cutting relation to a circle the radius of which is defined by the longitudinal axis of the cutter 21 and the cutting edge 23a of any one of the blades 23. Opposite the cutting bars 30 and 31 and extending the length of the blades 23, is a sealing element 19 integral with the housing 20 and continuous between the inlet and outlet openings 28 and 29. The sealing element 19 is in closely spaced relation to a circle the radius of which is defined by the longitudinal axis of the cutter 21 and the cutting edge 23a of any one of the blades 23.

There are numerous variations in types of sealing elements that can be utilized. FIGURES I and II illustrate two particular sealing elements. In principle, the sealing element provides a means for separating the inlet and outlet openings. The rotating cutter and blade means combination in cooperation with the cutting bar means and sealing element chip the solid materials after they enter the inlet opening and throw the chips through the outlet opening. The sealing element provides a means of enhancing the blower action of the rotating cutter means and blade means combination. The centrifugal force of the rotating cutter and blade means combination throws the chips away from the blade means so that they are not carried around in the space between the cutting edge of the blade means and the cutter means and are further prevented from returning to the inlet opening by the sealing element. Thus any number of sealing element variations can be used. All will yield very good results in operation, although some given relatively better results than others.

SPECIFIC DESCRIPTION

Particularly preferred is the improved machine illustrated in FIGURES III–VI. It has been found that this machine is simple and economical to construct and that it produces optimum results in operation.

Referring to FIGURES III–VI, a shaft 32 mounts a cylindrical cutterhead (cutter) 33 through the longitudinal axis of the cutterhead (cutter) 33. The shaft 32 with an integral mounting shoulder 35 is held in place by a key 34. Five flat, tapered blades 36 having cutting edges 36a are mounted in equally spaced relation around the cylindrical cutter 33 and are mounted across the cylindrical cutterhead (cutter) 33 such that they are parallel to the longitudinal axis of the cutterhead (cutter) 33. The combination of the cutterhead (cutter) 33 and blades 36 rotates in a clockwise direction as shown in operation and the blades 36 and the cutting edges 36a are inclined in the direction of rotation.

Each of the blades 36 are positioned in a groove 37 which is wedge shaped in cross section having two opposing sides and a bottom. The blades 36 are positioned in and on one side of each of the grooves 37 such that the cutting edges 36a of the blades 36 project from the surface of the cylindrical cutterhead (cutter) 33. The blades 36 have a trailing edge 36b opposite the cutting edge 36a. Mounted across the trailing edge 36b are three adjustable screws 38 projecting from the trailing edge 36b and in contact with the bottom of the groove 37. A wedge 39, having an integral, threaded wedge puller hole 39a, is positioned in the groove 37, between the blade 36 and the other side of the groove 37 and is held in position by a bolt 40 which is secured into the bottom of the groove 37 in the cutterhead (cutter) 33.

The cutterhead (cutter) 33 is rotatably mounted in a housing 41, comprising a removable cover 42, sides 43, 44, 45 and 46 and a bottom 47, which encloses the cutterhead (cutter) 33. The cover 42 has two handles 42a and 42b for ease of removing the cover 42 and four bars illustrated at 42cc and 42d each mounting a bolt illustrated at 42f and 42g to secure the cover to the sides 45 and 46. The shaft 32 is supported for rotation at both ends by two bearings 48 and 49 mounted by split rings 50 and 51, secured together by four bolts illustrated at 50a, 50b and 51a. The split rings 50 and 51 are mounted on supports 52 and 53, secured to the sides 45 and 46 of the housing 41, by four bars illustrated at 52a, 52b and 53a secured to the supports 52 and 53 each mounting a bolt, illustrated at 52c, 52d and 53c, which are in threaded connection with each of the ends of the split rings 50 and 51.

Sealing elements 54 and 55 are adjustably mounted by bolts 56 and 57 on the housing 41 above opposing inlet and outlet openings 58 and 59. Cutting bars 60 and 61 are mounted on the housing 41 opposite the sealing elements 54 and 55 and on the bottom 47 of the housing 41. The sealing elements 54 and 55 are in closely spaced relation to a circle the radius of which is defined by the longitudinal axis of the cutterhead (cutter) 33 and the cutting edge 36a of any one of the blades 36.

The housing 41 is supported at the bottom 47 by support channels 62 and 63 and mounting bars 64 and 65.

FIGURE V shows a feeder chute 70 attached to the inlet opening 58 which is the shape of a truncated pyramid with a rectangular cross-section, having its apex leading towards the inlet opening 58. A tubular chip chute 71 is also provided for directing the flow of the chips. The feeder chute 70 and outlet chute 71 are normally used in connection with brush chippers. The chip chute 71 is provided with a door 66 with a hinge 68 and a latch 67 on its underside for cleanout and adjustment of seal.

A power pulley 69 is mounted on one end of the shaft 35 to provide a means for mounting pulleys from a drive source (not shown) to power the machine.

OPERATION

The improved machine of the present invention will throw the chips out the chip chute and for long distances away from the chip chute, by virtue of the sealing element. Further chip return to the inlet opening is virtually eliminated. Illustrative of the operation of the improved machine of the present invention are the results shown in the table for the preferred machine of the present invention shown in FIGURES III–VI.

TABLE

| Cutter, r.p.m. | Distance, feet | Percent chip return |
|---|---|---|
| 1,000 without seals | 12 | 7 |
| 1,000 with seals | 18 | 9 |
| 1,500 without seals | 16 | 14 |
| 1,500 with seals | 28 | 1 |
| 2,000 without seals | 22 | 13 |
| 2,000 with seals | 39 | 3 |
| 2,500 without seals | 30 | 12 |
| 2,500 with seals | 46 | 3 |
| 3,000 without seals | 31 | 11 |
| 3,000 with seals | 50 | 2 |

As can be seen from table, there is a marked improvement in operation because of the use of the sealing element. In the normal operating range of 2000–3000 r.p.m., the percentage chip return is reduced to about $\frac{1}{10}$ of that without the seals. Further the overall percentage chip return to the inlet opening is extremely small. Further, in this operating range, the distance the chips are thrown is increased by about ½ again as much. This is also a marked improvement and this contributes considerably to efficient operation.

It will be appreciated that the sealing element can be constructed in various ways. Thus, in FIGURES I and II improved machines are schematically illustrated with different sealing elements. In essence all that is required is that the sealing element be positioned opposite the cutting element and between the inlet and outlet openings and be in closely spaced relation to the blades on the cutter. In this manner the full blower action of the revolving cutter is utilized. Variations in the shape and positioning of the sealing element are within the skill of the art and are intended to be included within the scope of the present invention.

It will be appreciated that any number of cutting bar elements or means can be utilized in the improved machine of the present invention. However, it is preferred to use two cutting bars as illustrated in FIGURE III. If one cutting bar is used, the chips are larger. If smaller chips are required, a second cutting bar is used as shown in FIGURE III.

It will be appreciated that any number of flat or curved blades can be used on the cutter. Thus, FIGURE I illustrates a ten blade system, FIGURE II a four blade system and FIGURES III–VI a five blade system. It has been found that the five blade system with an odd number of blades produces optimum results and thus this system is preferred. Also it should be noted that the blades are generally inclined in the direction of rotation to reduce the stresses on the blade.

It will be appreciated that the blades or knives are preferably tapered as illustrated in FIGURE III. They are more firmly mounted on the cutter means with the wedge because of the taper. Further it will be appreciated that it is preferred that about ⅔ of the blade from the trailing edge is soft and pliable while the ⅓ of the blade including the cutting edge is tempered. The resulting blade is very durable particularly where operated in very cold temperatures.

It will be appreciated that the machine can be constructed of various materials, although steel construction is preferred for rugged service. Further welded construction is preferred whenever possible. The machine can be of any size although the preferred machine shown in FIGURES III–VI has the following preferred specifications:

| | |
|---|---|
| Diameter of cutter | 14" |
| Length of cutter | 12" |
| Diameter of shaft | 2¹⁵⁄₁₆" |
| Width of blades | 3" |
| Power, gasoline engine. | |

It will be appreciated that the blade and adjustable screw combination shown in FIGURE III is considerably improved over the prior art system shown in FIGURE II. Thus with the improved system shown in FIGURE III, the dimensions of the blade between the adjustable screws and cutting edge can easily be determined in the shop after grinding. Since there are two or more of the adjustable screws, mounted on the blade, adjustment can be easily made for differences in sharpening between the ends of the blade. Once the blades are pre-set, they can easily be installed in the cutter. The prior art system shown in FIGURE II makes blade adjustment time consuming and difficult since the adjustment must be made after the blades are mounted on the cutter. For this reason the improved system shown in FIGURE III is preferred in the improved machine of the present invention.

It will be appreciated that various blower systems can be incorporated into the improved machines of the present invention near or at the outlet opening. While this is not preferred because a blower is unnecessary in most instances, the sealing element prevents the chips from being returned to the inlet opening, assuming the blower is properly mounted. The blower must not force the chips between the cutter and blades to be carried around to the inlet opening.

It is intended that the foregoing description be only illustrative of the present invention and that this invention be limited only by the hereinafter appended claims.

I claim:
1. The improved blade combination for providing ease of dimensional adjustment of blades in machines for chipping and shaving solid materials which comprises:
   (a) integral blade means made of steel having a generally rectangular cross-section with short sides and long sides and having a cutting edge generally triangular in cross section integral with one short side, the long sides tapering towards the cutting edge; and
   (b) a plurality of adjustable screw elements mounted on the second short side opposite the cutting edge of the blade means, the screw elements each having an end projecting from the second short side of the blade to provide dimensional adjustment between the ends of the screw elements and cutting edge of the blade means.
2. The combination of claim 1 wherein said blade is flat.
3. The improved blade and cutterhead means combination for machines for chipping and shaving solid materials which comprises:
   (a) integral cutterhead means having a longitudinal axis, having a cylindrical surface parallel to the longitudinal axis and having a plurality of grooves which are wedge shaped in cross-section each groove having two opposing sides and a bottom, the grooves being regularly spaced around the cylindrical surface;
   (b) integral blade means, made of steel, having a generally rectangular cross-section with cutting and opposite trailing edge short sides and with long sides tapering towards the cutting edge short side, with a plurality of adjustable screw elements having an end projecting from the trailing edge short side of the blade means to provide dimensional adjustment between the end of the screw element and the cutting edge of the blade means by means of contact with the bottom of the groove, the blade means being positioned on one side of the groove in the cutterhead means with the cutting edge of the blade means extending above the cylindrical surface of the cutterhead means; and
   (c) wedge means mounted in the groove between the blade means and the opposite side of the groove to secure the blade means to the cutterhead means.
4. The combination of claim 3 wherein the grooves are parallel to the longitudinal axis of the cutterhead means and wherein the blade means are flat.
5. The combination of claim 3 wherein five blades are provided.

References Cited

UNITED STATES PATENTS

| | | | |
|---|---|---|---|
| 1,747,455 | 2/1930 | Miller | 29—105 |
| 2,785,456 | 3/1957 | Gairing | 29—105 |
| 3,214,106 | 10/1965 | Gorman | 241—221 |
| 3,268,178 | 8/1966 | Schoeppner | 241—189 |
| 3,321,145 | 5/1967 | Gorman | 241—189 |
| 2,634,062 | 4/1953 | Forman. | |
| 2,836,206 | 5/1958 | Gaskell | 144—218 X |
| 3,039,503 | 6/1962 | Mainone | 144—230 |
| 3,324,909 | 6/1967 | McCranie | 144—218 X |

GERALD A. DOST, *Primary Examiner.*

U.S. Cl. X.R.

29—105; 144—230, 172; 241—189